M. WALTER.
STEERING MECHANISM FOR MOTOR VEHICLES.
APPLICATION FILED FEB. 20, 1917.
1,248,580.
Patented Dec. 4, 1917.
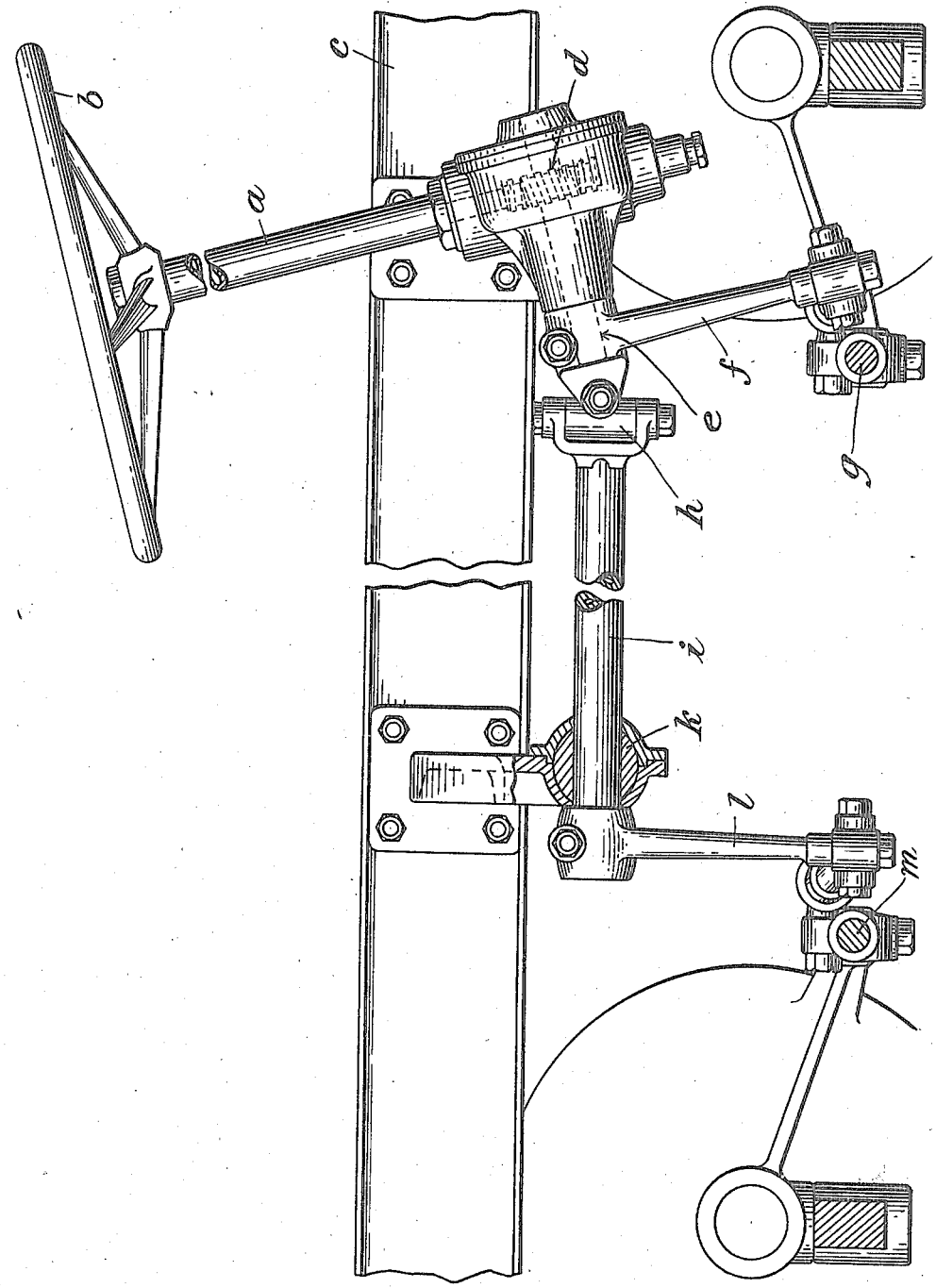
Inventor:
by  Maurice Walter
Redding Greely & Goodlett
Attys

UNITED STATES PATENT OFFICE.

MAURICE WALTER, OF NEW YORK, N. Y.

STEERING MECHANISM FOR MOTOR-VEHICLES.

1,248,580. Specification of Letters Patent. Patented Dec. 4, 1917.

Original application filed September 13, 1916, Serial No. 119,842. Divided and this application filed February 20, 1917. Serial No. 149,845.

*To all whom it may concern:*

Be it known that I, MAURICE WALTER, a citizen of the United States, residing in the borough of Manhattan of the city of New York, in the State of New York, have invented certain new and useful Improvements in Steering Mechanism for Motor-Vehicles, of which the following is a specification, reference being had to the accompanying drawing, forming a part hereof.

This application is a division of an application filed by the present applicant on September 13, 1916, Ser. No. 119,842, and seeks to cover an invention relating to steering mechanism for motor vehicles, particularly with reference to the application of such mechanism to commercial vehicles of the type in which both the driving and steering efforts are applied to each one of the four wheels. The general objects of the invention are to provide steering mechanism for the use specified which shall be simple in construction, flexible under frame distortion and jouncing, irreversible and connected directly with the wheels. Heretofore the steering devices employed in vehicles having four-wheel drives have been relatively complicated and have involved the interposition of many gears and links for the transmission of the steering effort. Further, these devices have never embodied the desirable conditions of flexibility and irreversibility, the presence of one of these factors in such known construction always precluding the presence of the other. The simplicity which characterizes the ordinary steering mechanism of a two-wheel drive has never, so far as known, been so closely approached as in the present improvements. In accordance with the invention the steering post is connected through worm gearing with a swinging steering arm which controls the steering rod for the two front wheels in practically the identical manner employed in a two-wheel drive. To this control is connected flexibly a steering shaft which extends rearwardly under the frame, and is in turn connected operatively to the steering rod for the rear wheels so that while front and rear wheels are given a complementary movement they are permitted that degree of flexibility under frame distortion and jouncing which is essential for the prevention of undue stresses. Other features of the mechanism will be described in greater detail in connection with the accompanying drawing which shows, somewhat schematically, the improved steering devices applied to the four driven wheels of a truck.

In the first place, it is to be understood that steering devices in modern vehicles must accommodate their mechanical requirements to the convenience of the operator so that the construction and relative disposition of the elements are to be determined primarily with reference to the character and position of the steering post $a$. This steering post which has thereon a steering wheel $b$ of usual construction is usually mounted at the forward end of the side frame members $c$ of the chassis and is inclined for the greater convenience of the driver. The post is geared operatively, as with worm gearing $d$, with a stub shaft $e$, the axis of which is necessarily inclined to the horizontal to conform to the inclination of the steering post. On this stub shaft $e$ is secured a swinging steering arm $f$ connected to a transverse steering rod $g$ for the front wheels. The construction as thus far described satisfies the requirements of a two-wheel drive, is simple in construction and entirely convenient for the manipulation of the driver. The problem of connecting such a steering post to the rear wheels, so that these wheels will be given a complementary movement with relation to the front wheels is one which has received a great deal of attention and yet is one which, in practice, has been met by devices which are relatively complicated involving the use of a great number of gears and links, and relatively inflexible, oftentimes permit relative movement between one or more of the wheels when these wheels leave the ground, require the exercise of great muscular effort in their operation and prevent the convenient inclination of the steering post $a$, or are open to one or more of these objections. In the improved construction there is connected to the stub shaft $e$ through a universal joint $h$ a rearwardly extending steering shaft $i$ which is journaled on the side frame member $c$ by means of a ball and socket support $k$. At the rear end of this shaft $i$ is secured a swinging steering arm $l$ which, in turn, is connected to the transverse steering rod $m$ for the rear wheels.

From the description given it will be evident that the front and rear wheels being directly connected to each other and to the steering post $a$ will be given, at all times, a complementary movement, with little effort. Further, by reason of the direct and positive interconnection of the steering rods $g$, $m$, and their conjoint connection to the worm gearing $d$, both of these rods are locked by this worm gearing and the entire steering mechanism is thereby made irreversible in character. This is of special importance in four-wheel drives where it must be remembered it is a very usual thing on rough roads for one or more of these wheels to be constantly off the surface of the roadway, thereby introducing a force tending to initiate back-lash and back-kick. Again, such jouncing as the rear wheels are subjected to and the distortion of the frame member $c$ with relation to the wheels cannot serve to impress objectionable stresses on the steering shaft $i$ or its connections since this shaft is flexibly supported on the frame members by the ball and socket bearing $k$ and is in turn connected flexibly to the actuating shaft $e$ through the universal joint $h$.

In addition to the important advantages noted the improved construction is clear and simple throughout, the connections being direct and superfluous transmission elements, such as links, gears, etc., being eliminated.

I claim as my invention:

1. In a motor vehicle, in combination with a four-wheel drive, steering mechanism including an inclined steering post, steering rods connected operatively with the pairs of wheels, respectively, a swinging steering arm geared directly to the post by a worm gearing and connected to the steering rod for the front wheels, a steering shaft extended rearwardly from said steering arm and connected to the steering rod for the rear wheels, and a universal joint interposed between the steering shaft and the worm gearing.

2. In a motor vehicle, in combination with a four-wheel drive, steering mechanism including an inclined steering post, steering rods connected operatively with the pairs of wheels, respectively, a shaft engaged with the steering post and with said steering rods, and flexible connections interposed in said shaft whereby simultaneous and complementary movement of all of said wheels may be effected.

3. In a motor vehicle, in combination with a four-wheel drive therefor and a chassis, a four-wheel steering mechanism including an inclined steering post, steering rods for the pairs of wheels, respectively, a steering shaft extending longitudinally of the vehicle and engaged with the steering post, arms carried on said shaft and engaged operatively with said rods, a universal joint interposed in said steering shaft, and a ball and socket support on the chassis for said shaft, whereby alinement of said shaft is maintained automatically.

This specification signed this 19th day of February, A. D. 1917.

MAURICE WALTER.

Copies of this patent may be obtained for five cents each, by addressing the "Commissioner of Patents, Washington, D. C."